July 15, 1969   V. SHANOK ETAL   3,455,546

IMPACT-RESISTANT MEMBER

Filed Sept. 1, 1966

INVENTORS
VICTOR SHANOK
JESSE A SHANOK
BY Friedman & Goodman
ATTORNEYS

United States Patent Office 3,455,546
Patented July 15, 1969

3,455,546
IMPACT-RESISTANT MEMBER
Victor Shanok and Jesse P. Shanok, Brooklyn, N.Y., assignors to Glass Laboratories Company, Brooklyn, N.Y., a limited partnership of New York
Filed Sept. 1, 1966, Ser. No. 576,679
Int. Cl. F16f *1/37, 1/44*
U.S. Cl. 267—1                                      3 Claims

ABSTRACT OF THE DISCLOSURE

An impact-resistant structural member comprising a shell composed of a resilient impact-resistant material and a core comprising at least one impact-resistant foam.

---

This invention relates to impact absorbing and cushioning objects, and to processes for producing the same. In particular, this invention relates to an impact-cushioning structural member comprising on outer shell or skin of resilient material, containing a filling of impact-absorbing and force-distributing material such as a plastic foam or the like, as more fully described hereinafter, and to processes for the manufacture of such a structural member.

It is desirable in numerous fields of construction to provide structural materials or members which are impact resistant and which distribute the forces of impact so that the structural material or member is not disfigured. This desideratum is felt particularly in the automotive industry where such materials are sought for use as structural members and the like for the automobile interior. More specifically, it is an immediate need in this industry to provide structural material which is not only impact resistant and force-distributing but also sufficiently resilient to return to its original shape and appearance after the impacting force is withdrawn. Such a material must have the property of being deformable upon impact e.g. impact of the human body, and must be impact-resistant i.e. resistant so as not to be permanently disfigured by such impact. Moreover, it must be force distributing so that the impacting member, such as the body of an automobile occupant, is not injured. It is also desirable to provide a material which combines not only all of these properties but, in addition thereto, the ability to provide ever increasing impact resistance in response to increasing values of the force of impact. That is to say, that the reactive force exerted by the structural member, tending to resist the advance of the impacting object—such as the body of the occupant of the automobile—should be more or less proportional to the force exerted by the impacting member. Thus, for the comfort of the auto occupant, it is desirable that the impact-absorbing member be readily deformable in response to a relatively light impact, such as the normal bumps incidental to entering and leaving the car, cornering, etc., whereas for safety, it is desirable that the impact-absorbing member be capable of absorbing a sharp, forceful impact, such as may be experienced during a collision, without "bottoming" and losing its effectiveness. This combination of properties can be provided to some extent by providing a very thick pad of very light, spongy material, but such a construction tends to take up an undesirably large amount of interior space, and it is desirable to provide an impact absorbing structure capable of providing such a combination of properties in more compact form.

It is an object of this invention, therefore, to provide an improved impact-absorbing structure.

It is another object of this invention to provide a structural member or material having a resilient impact-resistant shell and a core of an impact resistant force distributing material.

It is another object of this invention to provide such a structural material which upon impact is deformed but not permanently disfigured.

It is still another object of this invention to provide such a structural member useful in automobile interior stripping and paneling which provides ever increasing impact resistance upon increase in impact thereon.

It is still another object of this invention to provide a process for preparing such structural materials or members.

These and other objects and advantages will become apparent from the following complete description of the invention, accompanying drawings and appended claims.

In one desirable aspect, this invention contemplates a process for producing an impact resistant deformable object having a core comprising an impact resistant foam which comprises introducing into a hollow shell of a resilient impact-resistant material at least one foam forming mixture under conditions of temperature and pressure to permit in situ formation of said foam.

In a particularly desirable embodiment this invention contemplates a process for producing an impact resistant deformable object having a core comprising an impact resistant foam which comprises introducing into a hollow shell composed of a resilient impact-resistant material a first foam forming mixture under conditions of temperature and pressure to fill only a portion of said shell with a foam, introducing at least one additional foam forming mixture under conditions of temperature and pressure to fill the balance of said shell with a foam of different density from that resulting from said first foam forming mixture.

This invention also contemplates an impact resistant structural member comprising a shell composed of a resilient impact-resistant material and a core comprising at least one impact resistant foam.

In the best mode contemplated for carrying out this invention, three separate layers of gradually decreasing density foam are provided in said shell as the core, the third layer of foam being provided by introducing a third foam forming mixture after the second foam forming mixture under conditions of temperature and pressure to provide a foam within said shell less dense than the foam formed from said second foam forming mixture.

The product produced according to this invention comprises a shell composed of a semi-rigid, resilient, impact-resistant material and a core comprising at least one impact resistant foam. Preferably, there are, as implied above, several foams of decreasing densities away from the point of impact to provide ever increasing impact resistance and force distribution with increasing impact. In the most preferable embodiment there are three layers of foams of different densities forming the core, the highest density foam closest the point of impact and the lowest density foam farthest therefrom.

In order to more readily understand the process and product of this invention, reference is made to the accompanying drawings in which.

Figure 1:
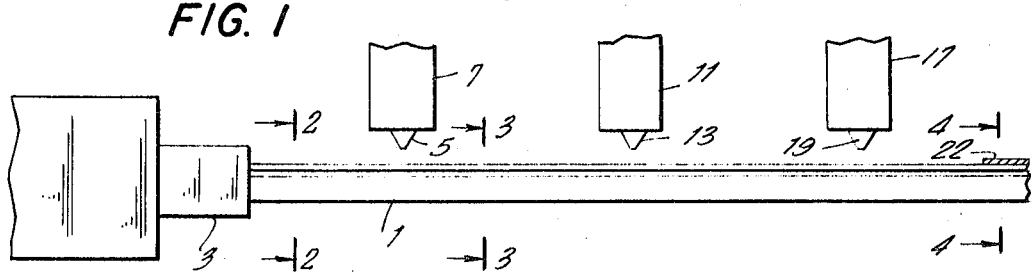
FIGURE 1 is a side elevation of a hollow shell being filled with foam forming mixtures in the process of this invention.
Figure 2:
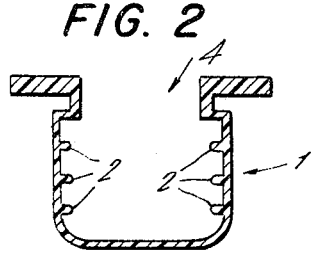
FIGURE 2 is a sectional elevation taken along the lines 2—2 of FIGURE 1, showing the channel-form cross section of the shell.
Figure 4:
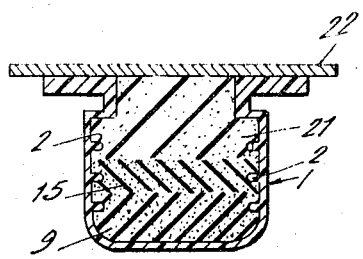
FIGURE 4 is a sectional elevation taken along the lines 4—4 of FIGURE 1.
Figure 3:
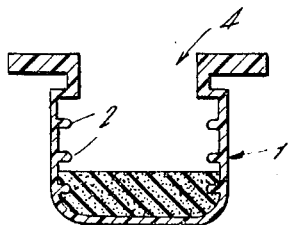
FIGURE 3 is a sectional elevation taken along the lines 3—3 of FIGURE 1.
Figure 6:
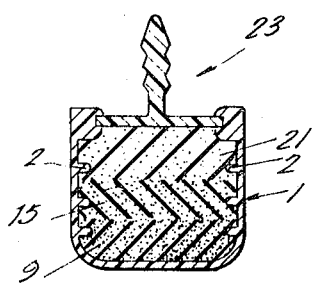
FIGURE 6 is a sectional elevation of a structural member or material of this invention.

In accordance with the process of this invention a hollow shell as shown in FIGURE 2, preferably having inwardly extending projections 2 forming small grooves on the inside walls is extruded from extruder 3. The shell is composed of a semi-rigid, resilient impact-resistant shell e.g. acrylonitrile-butadiene-styrene terpolymer, butyl rubber, natural rubber, polyhexamethylene adipamide, polycaproamide, polyvinyl chloride or polyethylene. It passes under spout 5 on which is mounted a reservoir 7 containing a first foam forming mixture. A foam forming mixture empties into shell 1 in amount sufficient to fill about one third of the shell. The foam forming mixture is suitably a mixture providing a polyurethane foam. It is suitably a mixture of 80%, 2,4 and 20% 2,6 toluene diisocyanate together with a polyether or polyalcohol. The mixture contains a propellant such as that marketed under the trademark Freon by E. I. du Pont de Nemours and Company. A small quantity of catalyst is also present. The foam formed has a density between 1.5 and 18 pounds per cubic foot providing a compressive strength between 2000 pounds per square foot and 70,000 pounds per square foot. Preferably the density is between 12 and 18 pounds per cubic foot. Other foam forming mixtures include urea-formaldehyde foams of urea-formaldehyde resins, phenol-formaldehyde foams, melamine-formaldehyde foams, foamable vinyl polymer and materials such as foamed polystyrene e.g. Styrofoam. The foam provided is designated by reference numeral 9.

The partially filled shell continues and there is introduced therein from reservoir 11 via spout 13 a second foam forming mixture, preferably a polyurethane foam forming mixture, to fill the shell about two thirds. The density of this foam 15 provided by the second foam forming mixture is less than the density of the first foam 9, preferably between about 8 and 12 pounds per cubic foot.

The shell continues moving and there is introduced therein from reservoir 17 via spout 19 a third and final foam forming mixture resulting in foam 21. This foam 21 has a density less than foams 9 and 15, preferably between 1.5 and 9 pounds per cubic foot. There is then placed over the opening 4 of shell 1 a piece of material 22 to restirct expansion of the foam to the space within the shell. This may be, as shown, a flat plate under which the foam-filled channel passes after passing under spout 19.

The amounts of the three respective foams can be regulated by regulating the discharge rate of the foam forming material from the reservoir and spouts in relation to the rate at which the shell 1 is passed beneath the open spouts 5, 13 and 19. The resulting structural member may be mounted in an automobile interior or the like in any convenient manner, for example by cementing.

In another embodiment of this invention, a shell having a grooved top is provided into which there is fastened T shaped fastening means 23 which not only serve to restrict foam expansion but provide a means to fasten the structural member so formed to the interior of an automobile, for example.

There is thus provided a structural member comprising a resilient impact resistant shell and a core of impact resistant force distributing material arranged geometrically within the shell to provide increasing impact resistance with increasing severity of the impacting force.

In order to more fully illustrate the nature of this invention and the manner of practicing the same, the following example is set forth showing the best mode contemplated.

EXAMPLE

Figure 5:
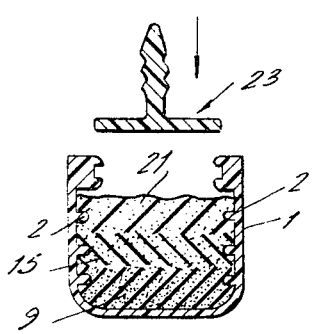
FIGURE 5 is a sectional elevation of a shell filled with foam with fastening means detached.

A shell having the configuration shown in FIGURE 5 and composed of a rigid, resilient acrylonitrile, butadiene, styrene terpolymer is extruded continuously from extruder 3 and passes beneath spout 5 in communication with reservoir 7. A mixture of 80%, 2,4 and 20% 2,6 tolydene diisocyanate and a polyether together with a halogenated hydrocarbon propellant marketed under the trademark Freon and a polyurethane forming catalyst is introduced at 75° F. into shell 1 in amount sufficient to fill one third of shell 1 with a polyurethane foam having a density of about 15 pounds per cubic foot. The one third filled shell passes beneath reservoir 11 communicating with spout 13 and another one third of the shell is filled with another polyurethane foam forming mixture, the relative proportions of ingredients being such that a foam of 10 pounds per cubic foot is provided. The two thirds filled shell passes beneath reservoir 17 communicating with spout 19 and the balance of the shell is filled with still another polyurethane foam forming mixture providing a foam having a density of about 5 pounds per cubic foot. Fastening means 23 is then inserted in the groove of shell 1 to restrict foam expansion. The product so produced has the ability to withstand increasing impact without disfigurement. It returns to its original shape upon cessation of force thereagainst. It is particularly useful in automotive interior as paneling or parts of the dashboard.

The invention has been described primarily with reference to a preferred embodiment, wherein foam layers of three different densities are employed, the layer nearest the impact-receiving surface being the most dense, followed by an intermediate layer of intermediate density and in turn by a layer of least density which is farthest from the impact surface. This construction is preferred, because the initial deformation takes place at the rear of the member, rather than directly under the impact point, which helps to distribute the impact forces and prevent any permanent deformation of the impact-receiving member at the point of impact. Obviously, if desired, only two foam layers, or more than three, may be used, and these may be disposed with the densest layer nearest the impact point, or in the opposite order, or in various other ways which will readily suggest themselves to those skilled in the art. A single density of foam may also be used, in place of a plurality of foams of different densities, but it is preferred to use a plurality of densities because this permits the lower-density foam to yield readily, cushioning minor bumps, while the denser foam layer or layers remain in reserve to absorb severe impacts.

From the foregoing it is apparent that this invention provides a structural member having a resilient impact resistant shell and a core of an impact resistant, force distributing material which member upon impact is deformed but not permanently disfigured and which provides ever increasing impact resistance upon increase in impact thereon.

The terms and expressions which have been used herein are used as terms of description and not of limitation, as there is no intention, in the use of such terms and expressions, of limiting the invention, as many modifications or departures are possible within the scope of the invention claimed.

We claim:

1. An impact-resistant structural member comprising a shell composed of a resilient impact-resistant material and a core comprising at least two layers, of foam of differing densities.

2. An impact-resistant structural member comprising a shell composed of a resilient impact-resistant material and a core comprising three layers of foam of different densities arranged geometrically so that the highest density foam is closest the point of impact and the lowest density foam is farthest therefrom.

3. An impact-resistant structural member according to claim 2 wherein said shell is composed of an acrylontrile-butadiene-styrene terpolymer, said foams are polyurethane foams having densities of between about 12 and about 18 pounds per cubic foot, between about 8 and about 12 pounds per cubic foot and between about 1.5 and about 8 pounds per cubic foot respectively, and said structural member has affixed thereto a fastening means having a generally T-shaped cross-sectional configuration.

References Cited

UNITED STATES PATENTS

| | | | |
|---|---|---|---|
| 3,157,934 | 11/1964 | Williams | 262—63 |
| 3,195,601 | 7/1965 | Travers | 152—313 |
| 2,844,387 | 7/1958 | Shaw | 293—71 X |

ARTHUR L. LA POINT, Primary Examiner